(12) United States Patent
Omori et al.

(10) Patent No.: US 10,273,123 B2
(45) Date of Patent: Apr. 30, 2019

(54) ROUGH TERRAIN CRANE

(71) Applicant: TADANO LTD., Kawaga (JP)

(72) Inventors: Kazuya Omori, Kagawa (JP);
Fumitsugu Kusaka, Kagawa (JP);
Kenta Mitani, Kagawa (JP)

(73) Assignee: TADANO LTD., Kagawa (JP)

( * ) Notice: Subject to any disclaimer, the term of this patent is extended or adjusted under 35 U.S.C. 154(b) by 106 days.

(21) Appl. No.: 15/537,772

(22) PCT Filed: Aug. 17, 2015

(86) PCT No.: PCT/JP2015/073019
§ 371 (c)(1),
(2) Date: Jun. 19, 2017

(87) PCT Pub. No.: WO2016/098384
PCT Pub. Date: Jun. 23, 2016

(65) Prior Publication Data
US 2018/0273351 A1    Sep. 27, 2018

(30) Foreign Application Priority Data
Dec. 19, 2014  (JP) .................................. 2014-257065

(51) Int. Cl.
*B66C 23/62*  (2006.01)
*B60K 13/04*  (2006.01)
(Continued)

(52) U.S. Cl.
CPC .............. *B66C 23/62* (2013.01); *B60K 13/04* (2013.01); *B60K 15/063* (2013.01); *B66C 23/40* (2013.01);
(Continued)

(58) Field of Classification Search
CPC ...... F02D 41/029; F01N 9/002; F01N 3/0842; F01N 13/02; F01N 3/035; B60K 13/04
See application file for complete search history.

(56) References Cited

U.S. PATENT DOCUMENTS 9,027,697 B2    5/2015  Kobayashi et al.
2010/0038162 A1  2/2010  Kamiya et al.
(Continued)

FOREIGN PATENT DOCUMENTS

CN  101910577 A  12/2010
EP  2233714 A1   9/2010
(Continued)

OTHER PUBLICATIONS

Office Action issued in Chinese Patent Application No. 201580068962.3 dated Nov. 5, 2018.
(Continued)

*Primary Examiner* — James A Shriver, II
*Assistant Examiner* — James J Triggs
(74) *Attorney, Agent, or Firm* — Marshall, Gerstein & Borun LLP

(57) ABSTRACT

An SCR-quipped rough terrain crane in which a urea water tank is laid out at the optimal position is provided. A rough terrain crane is equipped with an exhaust emission control device that is laterally adjacent to a diesel engine. The exhaust emission control device is provided with a urea water tank and is laid out in a rear portion of at a vehicle body. The urea water tank is disposed on a front side of the exhaust emission control device. The urea water tank is disposed in the vicinity of the left side of the diesel engine when viewed from the rear side of the vehicle.

7 Claims, 5 Drawing Sheets

(51) Int. Cl.
*B66C 23/40* (2006.01)
*B60K 15/063* (2006.01)
*F01N 3/20* (2006.01)
*B66C 23/78* (2006.01)
*B66C 23/42* (2006.01)

(52) U.S. Cl.
CPC ............ *B66C 23/78* (2013.01); *F01N 3/2066* (2013.01); *B60Y 2200/416* (2013.01); *B66C 23/42* (2013.01); *B66C 2700/0357* (2013.01); *F01N 2590/08* (2013.01); *F01N 2610/02* (2013.01); *F01N 2610/1406* (2013.01); *Y02A 50/2325* (2018.01); *Y02T 10/24* (2013.01)

(56) References Cited

U.S. PATENT DOCUMENTS

| | | |
|---|---|---|
| 2010/0192551 A1 | 8/2010 | Yokota |
| 2010/0293928 A1 | 11/2010 | Kamiya et al. |
| 2016/0102593 A1* | 4/2016 | Noguchi ............ F01N 3/025 3/25 |

FOREIGN PATENT DOCUMENTS

| | | |
|---|---|---|
| JP | H05-213076 A | 8/1993 |
| JP | 2003020936 A | 1/2003 |
| JP | 2008-215003 A | 9/2008 |
| JP | 2009-40602 A | 2/2009 |
| JP | 2009-79422 A | 4/2009 |
| JP | 2009-275642 A | 11/2009 |
| JP | 4851370 B2 | 1/2012 |
| JP | 5054613 B2 | 10/2012 |
| JP | 2013-2082 A | 1/2013 |
| WO | WO-2014/061528 A1 | 4/2014 |
| WO | WO-2014/192197 A1 | 12/2014 |

OTHER PUBLICATIONS

International Preliminary Report on Patentability issued in PCT/JP2015/073019, dated Nov. 30, 2016.
Extended European Search Report issued in European Patent Application No. EP15869593 dated Jun. 18, 2018.
Office Action issued in Japanese Patent Application No. 2014-257065 dated Aug. 7, 2018.
International Search Report issued in PCT/JP2015/073019 dated Oct. 20, 2015.

* cited by examiner

ROUGH TERRAIN CRANE

TECHNICAL FIELD

The present disclosure relates to a rough terrain crane equipped with a selective catalytic reduction (hereinafter, referred to as "SCR"), particularly, to a layout of a urea water tank as a constituent element of the SCR.

BACKGROUND ART

The exhaust emission of diesel engines contains particulate matter (hereinafter, referred to as "PM"), nitride oxide (hereinafter, referred to as "NOx"), or the like. An exhaust emission control device that prevents the particulate matter from being released into the air so as to prevent the air pollution has been developed heretofore. The exhaust emission control device includes, as the constituent elements, a diesel particulate filter (hereinafter, referred to as a "DPF") for collecting the PM, a diesel oxidation catalyst (hereinafter referred to as "DOC") for removing the NOx, a decomposition reactor tube (hereinafter referred to as "DRT"), and a selective catalytic reduction (hereinafter referred to as "SCR"). By combining the constituent elements, a desired exhaust emission control device is constituted.

The diesel engine is mounted on various types of vehicles; however, recently, there has been a high demand for exhaust emission control processing, and thus the SCR is employed also in a passenger car, a truck, a crawler construction machine, or the like. Since the urea water is used in the exhaust emission control processing by the SCR, a urea water tank, in which the urea water is stored, is additionally provided on a vehicle (for example, see Patent Documents 1 and 2).

In general, a rough terrain crane includes a carrier device that is capable of four-wheel driving and four-wheel steering, and exhibits excellent small-radius turning performance and rough terrain traveling performance. The rough terrain crane includes a single driver seat, has special performance that enables an operator on the driver seat to drive a vehicle and to perform an operation of a crane. The rough terrain crane is manufactured from compact design for exhibiting such special performance (merit) in which the entire length of the vehicle body is set to be short, an engine is disposed on the rear side of the vehicle body, and a crane operation is controlled by hydraulic pressure.

In a case where the exhaust emission control device is mounted on the rough terrain crane, the entire length and the entire width of the vehicle body must avoid an increase in size, a wide range of view and high visibility need to be secured when an operator performs the crane operation and vehicle driving on a single driving seat. Specifically, the DOC, the DRT, and the SCR are laid out such that the exhaust emission control device does not overhang from an end portion of the vehicle body, a blind spot is not generated to the operator, and the exhaust emission control device does not interfere with the driving seat, a counterweight, or the like during the crane operation and crane slewing (for example, see Patent Document 3).

However, in a large rough terrain crane, a front axle or a rear axle has a multi-axle structure, and a structure with a premise of attaching and detaching an outrigger and a boom to and from a vehicle-body frame is employed in some cases. The main reason for the front axle or the rear axle to have the multi-axis structure is to reduce the entirety of axle load to a certain load or lower. In addition, the reason for the structure with the premise of attaching and detaching the outrigger and the boom to and from the vehicle-body frame is employed is to be in accordance with the legislation of a country or a region where the large rough terrain crane is used. In other words, in some countries or regions, strict weight limit (axle load limit) is imposed on a vehicle traveling on a public road. Therefore, when the large rough terrain crane runs on a public road, the vehicle body, the outrigger, and the boom must be individually transported on a trailer in some cases (Request 1).

The urea water contained in the urea water tank selectively reduces the NOx in the exhaust gas; however, the urea water has properties of being frozen in a low-temperature environment and having degraded product quality in a high-temperature environment. Therefore, in a case where the rough terrain crane is used in a cold region, the urea water needs to avoid being frozen. In addition, also even in a case where the urea water is used in a high-temperature environment, the temperature of the urea water needs to be maintained to be a certain degree (preferably, 52° C. or lower) (Request 2).

If the urea water tank is disposed in any position around a vehicle frame without being in accordance with the requests, various problems arise in that piping, through which the urea water is supplied, becomes unnecessarily long, it is difficult to perform filling work of the urea water to the urea water tank, the urea water is frozen due to an environmental temperature, it is likely to degrade the product quality, and the like. Therefore, special measures are required for the layout of the urea water.

SUMMARY OF THE DISCLOSURE

The present disclosure is made under such background, and an object thereof is to provide a rough terrain crane in which an outrigger or a boom is freely attached and detached, as a compact rough terrain crane including a urea water tank which is laid out at the optimal position in a compact manner without impairing excellent small-radius turning performance such that SCR exhibit a good function in a low-temperature environment and a high-temperature environment.

(1) In order to achieve the object described above, a rough terrain crane according to embodiments includes: a lower carrier having a front axle and a rear axle; a boom device disposed above the lower carrier; and a single operating unit that performs driving and a boom operation via a hydraulic actuator. The lower carrier includes a lower frame, an outrigger provided to be freely attached and detached to an end portion of the lower frame, and an engine that is disposed on an upper side of a rear end portion of the lower carrier, drives the axles, and supplies hydraulic pressure to the hydraulic actuator. The rough terrain crane further includes a reducing agent tank in which a reducing agent is stored; and an exhaust emission control device that has a decompression reactor tube and a selective catalyst reduction disposed downstream of the decompression reactor tube. The exhaust emission control device is mounted to be laterally adjacent to the engine. The reducing agent tank is disposed on a front side of the exhaust emission control device in the vicinity of the engine.

In this configuration, since the exhaust emission control device is mounted, it is possible to control the exhaust of the rough terrain crane, and thus it is possible to meet the strict exhaust gas regulations in recent years. The reducing agent tank is disposed on a front side of the exhaust emission control device. Hence, the piping from the reducing tank to the selective catalyst reduction via the decompression reactor tube is simplified without an increase in the entire length and the entire width of the lower carrier, and thus a reducing agent is efficiently supplied to the decompression reactor tube. Moreover, it is easy to perform injection work of the reducing agent. In addition, the reducing agent tank is disposed in the vicinity of the engine. Hence, radiation heat from the engine is likely to be received. Further, cooling water of the engine is supplied to the reducing agent tank such that it is easy to arrange the piping for heating•maintaining temperature of the reducing agent tank. In addition, since the reducing agent tank is disposed at the position described above, there is no limitation on the layout design of the reducing agent tank even in a structure in which the outrigger is freely attached and detached.

(2) It is preferable that the reducing agent tank be disposed at a position adjacent to the exhaust emission control device.

In this configuration, it is advantageous in that the piping from the reducing agent tank to the decompression reactor tube is even more simplified.

(3) It is preferable that the reducing agent tank be disposed in a state of being dropped downward from the top surface of the lower carrier and a part of the reducing agent tank is exposed through the top surface.

In this configuration, since the reducing agent tank is exposed from the top surface of the lower carrier and thus it is easy to inject the reducing agent. Since the reducing agent tank is dropped downward from the top surface, the layout is performed in a more compact manner.

(4) It is preferable that the reducing agent tank has a protective frame that surrounds and protects the reducing agent tank.

In this configuration, the reducing agent tank is protected by the protective frame, and the protective frame functions as a step for an operator. In this manner, it is easy to remove a boom root fulcrum pin that connects the boom device to the lower carrier. Moreover, the protective frame functions as a step, and thereby it is possible to satisfy request of the exhaust gas regulations.

(5) It is preferable that the protective frame has an insulation member that surrounds the reducing agent tank.

In this configuration, when the environmental temperature during work increases, or the radiation heat increases, it is possible to reduce an increase in the temperature of the reducing agent tank. In this manner, the reducing agent is prevented from being degraded.

There is no limitation on the layout design of the reducing agent tank even in a structure in which the outrigger is freely attached and detached. In addition, it is easy to receive the radiation heat of the engine, and the cooling water of the engine is supplied to the reducing agent tank such that it is easy to arrange the piping for heating•maintaining temperature of the reducing agent tank. Moreover, it is easy to achieve the piping through which the reducing agent is supplied from the reducing agent tank to the selective catalyst reduction. In other words, the reducing agent tank is laid out at the optimal position without a loss in the small-radius turning performance of the rough terrain crane, rough terrain traveling performance, and high visibility or a wide range of view in a crane operation.

DESCRIPTION OF EMBODIMENTS

Hereinafter, a preferred embodiment will be described with reference to appropriate figures. Note that the embodiment is only an example of a rough terrain crane, and it is needless to say that the embodiment may be modified in a range without departing from a gist of the contemplated embodiments.

[Features of Entire Configuration]

Figure 1:
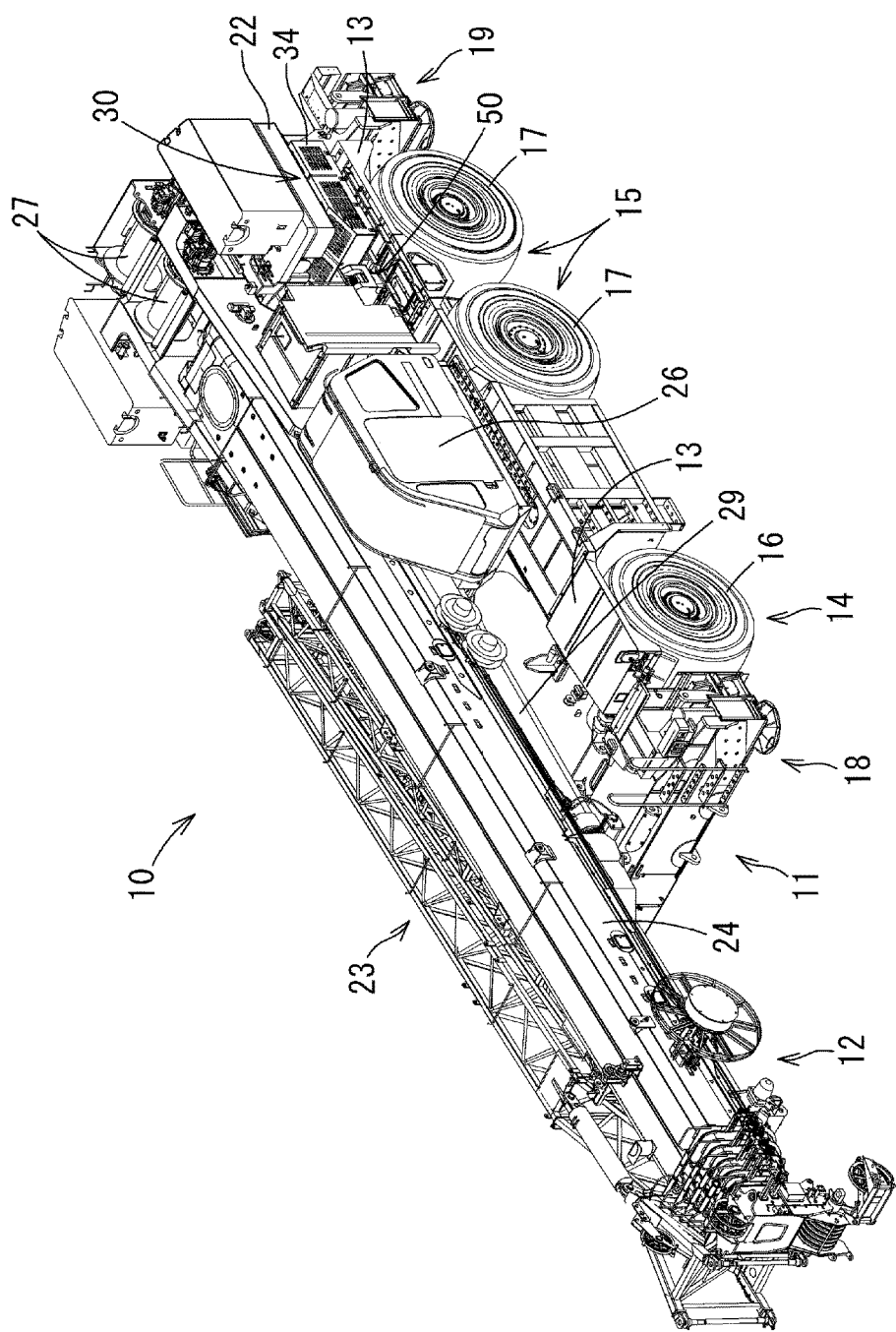
FIG. 1 is a perspective view of a rough terrain crane according to an embodiment.

FIG. 1 is a perspective view of a rough terrain crane 10 according to an embodiment.

The rough terrain crane 10 includes a lower carrier 11 and an upper working unit 12 disposed above the lower carrier 11.

The lower carrier 11 includes a lower frame 13, and a front axle 14 and a rear axle 15 are provided on the lower frame 13. A diesel engine 20 (refer to FIGS. 2 and 3) as a drive source of the front axle 14 and the rear axle 15 are mounted on an upper side of a rear end portion of the lower frame 13. Note that the diesel engine 20 includes an engine main body (not illustrated) and an engine cover 49 that covers the engine main body, and, in the embodiment, the diesel engine including the engine cover 49 is referred to as the diesel engine 20.

Wheels 16 and 17 of the front axle 14 and the rear axle 15 are driven by the diesel engine 20 via a transmission not illustrated and is steered by a hydraulic actuator not illustrated.

A front outrigger 18 and a rear outrigger 19 are mounted on a front end and a rear end of the lower frame 13, respectively, and overhang outward from the vehicle in order to maintain the stability of the vehicle during an operation of the upper working unit 12. The front outrigger 18 is connected to the front end of the lower frame 13 and is attachable to and detachable from the lower frame 13. The front outrigger 19 is connected to the rear end of the lower frame 13 and is attachable to and detachable from the lower frame 13. Note that the front outrigger 18, the rear outrigger 19, and the lower frame 13 are connected by a pin or other known means which is employed.

The hydraulic actuator, a hydraulic actuator 29 provided in the upper working unit 12, or a hydraulic pump (not illustrated) that supplies hydraulic pressure to the hydraulic actuator (not illustrated) provided in the upper working unit 12 is provided in the upper frame 13. The hydraulic pump is driven by the diesel engine 20.

The upper working unit 12 includes a slewing base 22 having a rear end on which a counterweight is disposed. The slewing base 22 is turnably mounted on the lower frame 13 through a slewing bearing (not illustrated). The boom device 23 is connected to the slewing base 22 via a boom-root fulcrum pin (not illustrated). The boom device 23 is supported to be undulated by the boom-root fulcrum pin. The boom device 23 undulates in response to expansion and contraction of the hydraulic actuator 29. An expansion boom 24 has an internally-installed hydraulic actuator (not illustrated), and operating of the hydraulic actuator causes the expansion boom to expand and contract. The boom device 23 has a winch 27 that is driven by a hydraulic motor (not illustrated), and operating of the winch 27 causes a work to move up and down. Note that the boom device 23 is attachable to and detachable from the upper working unit 12.

A single working unit 26 for driving the lower carrier 11 and operating the upper working unit 12 is supported on the lower carrier 11. For example, the driving of the lower carrier 11 means driving and steering of the wheels 16 and 17 for causing the rough terrain crane 10 to travel. The operating of the upper driving unit 12 means the undulation and expansion and contraction (boom operation) of the boom device 23 via the hydraulic actuator 29 and the internally hydraulic actuator installed in the expansion boom 24.

The rough terrain crane 10 according to the embodiment is characterized in that an exhaust emission control device 30, which will be described below, is mounted to be adjacent to the diesel engine 20 and a urea water tank 50 (corresponding to a "reducing agent tank" according to claims) included in the exhaust emission control device 30 is disposed as follows.

[Exhaust Emission Control Device]

Figure 2:
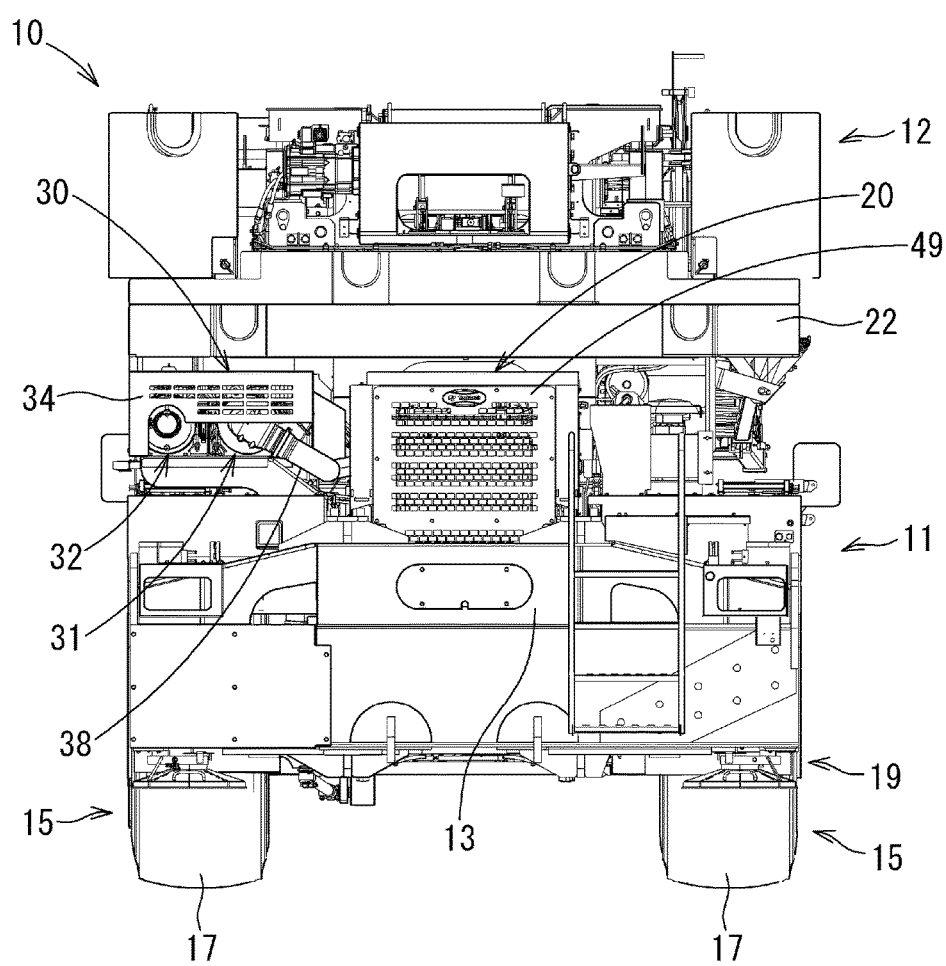
FIG. 2 is a rear view of the rough terrain crane according to the embodiment.

FIG. 2 is a rear view of the rough terrain crane 10 according to the embodiment. The exhaust emission control device 30 receives exhaust gas exhausted from the diesel engine 20 and control the same. The exhaust emission control device 30 is disposed on a left side when viewed from a vehicle rear side. The exhaust emission control device 30 is mounted to be adjacent to the diesel engine 20. In the embodiment, the exhaust emission control device 30 is provided with a cover 34. The cover 34 protects the exhaust emission control device 30 from being exposed to rain and dust.

Figure 3:
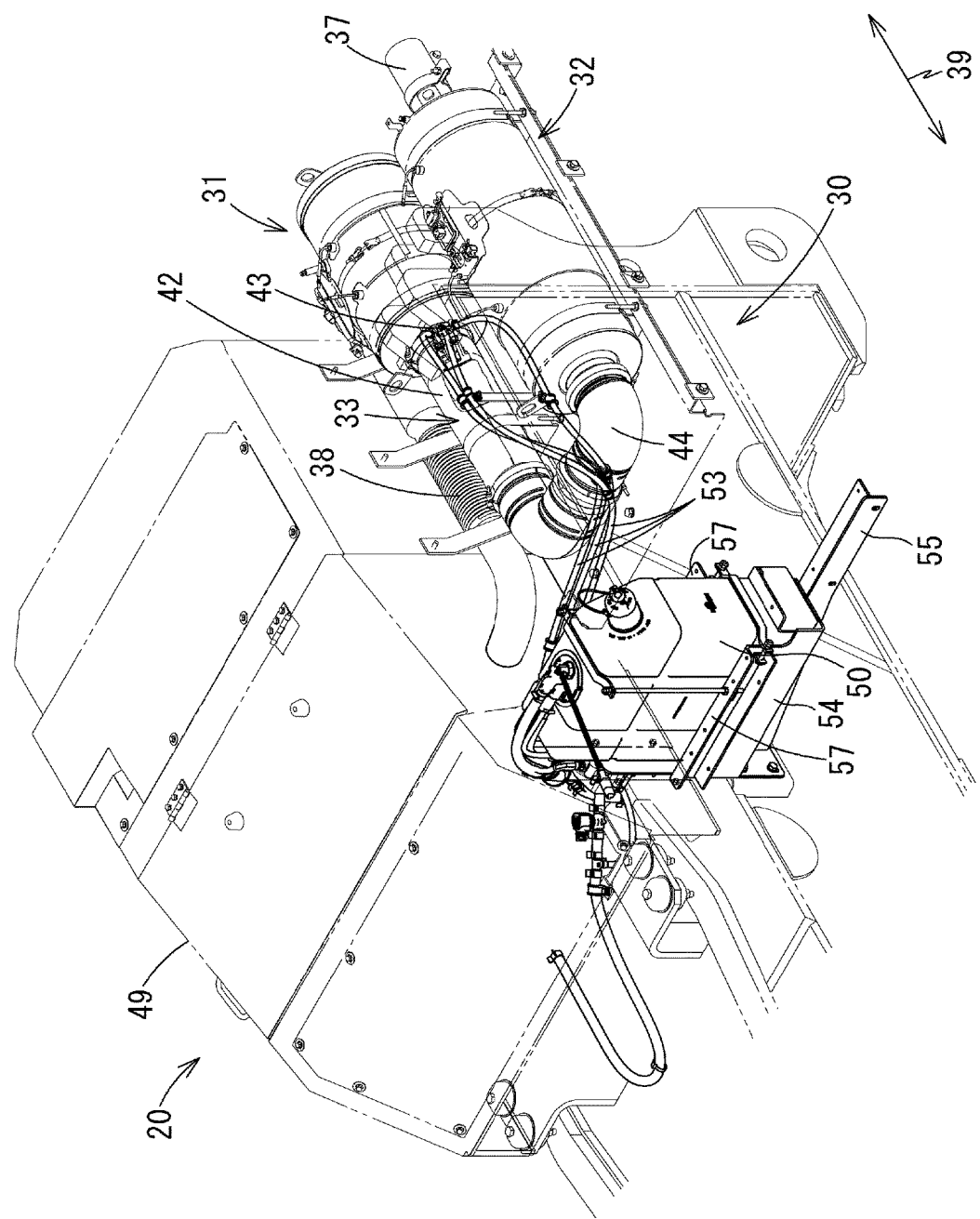
FIG. 3 is a perspective view illustrating an exhaust emission control device and the periphery of a diesel engine in the lower carrier according to the embodiment.
Figure 4:
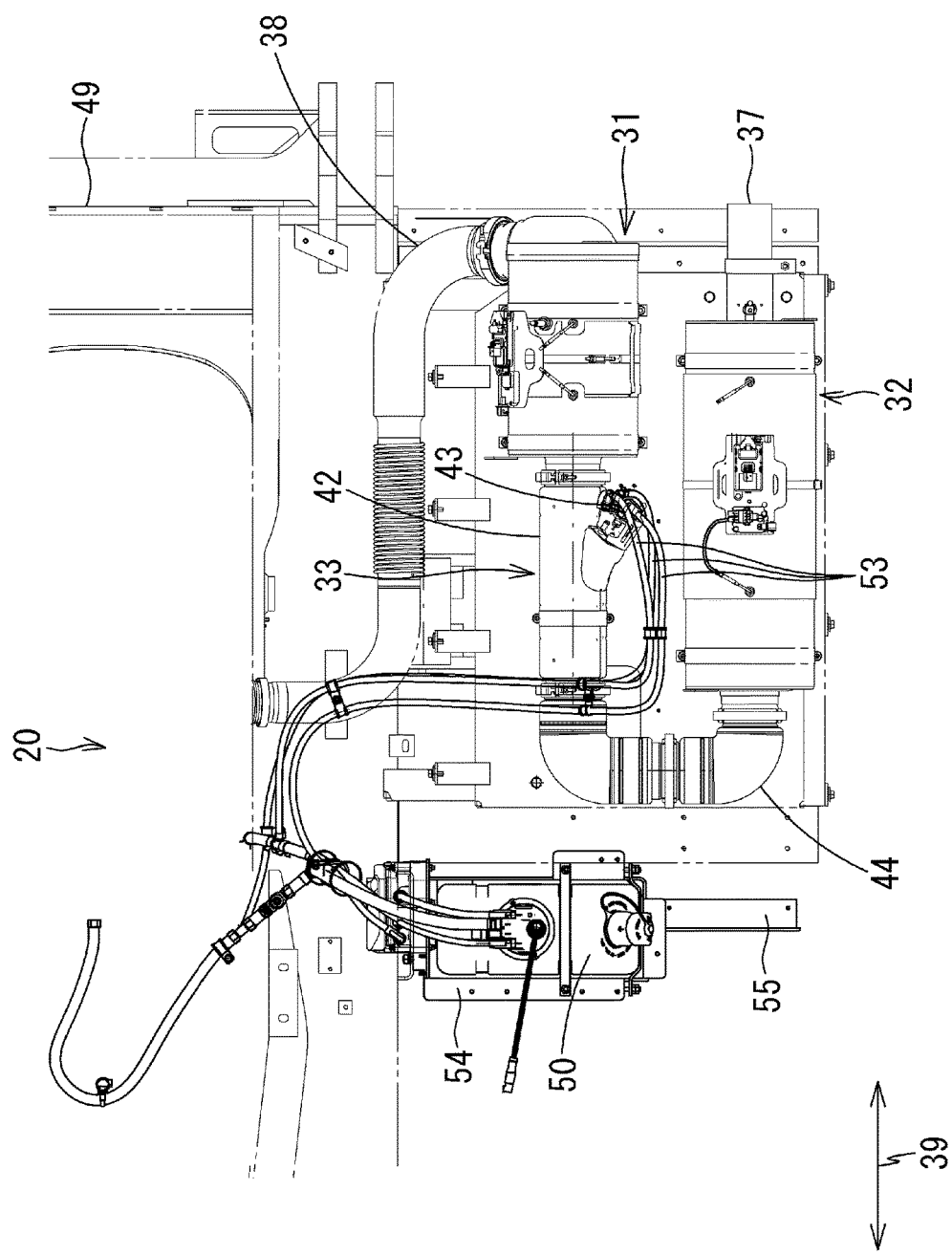
FIG. 4 is a plan view illustrating the exhaust emission control device and the periphery of the diesel engine in the lower carrier according to the embodiment.

FIG. 3 is a perspective view illustrating the exhaust emission control device 30 and the periphery of the diesel engine 20 in the lower carrier 11. FIG. 4 is a plan view illustrating the exhaust emission control device 30 and the periphery of the diesel engine 20 in the lower carrier 11. Note that the figures illustrate the layout of the exhaust emission control device 30 and the diesel engine 20, and the cover 34, the engine cover 49, or the like is omitted in the figures depending on views.

The rough terrain crane 10 includes the urea water tank 50 in which a predetermined reducing agent (urea water in the embodiment) is stored and the exhaust emission control device 30. The exhaust emission control device 30 includes a diesel oxidation catalyst (hereinafter, referred to as "DOC") 31, selective catalyst reduction (hereinafter, referred to as "SCR") 32 that reduces nitrogen oxide in the exhaust emission through the urea water, and a decompression reactor tube (hereinafter, referred to as "DRT") 33 that supplies the urea water to the SCR 32.

The exhaust emission from the diesel engine 20 is first supplied to the DOC 31, passes the DRT 33 and the SCR 32 in this order, and is released as exhaust gas from a muffler 37 to the atmosphere. Note that, in the embodiment, the muffler 37 a device (muffling device) reduces sound produced when the exhaust gas is released, which is neither the SCR nor a part of the SCR 32.

The DOC 31 is connected to the exhaust pipe 38 of the diesel engine 20. The structure of the DOC 31 is already known. The DOC 31 mainly aims at treating of unburned fuel (HC and the like) and carbon monoxide (CO) contained in the exhaust emission and oxidizing nitrogen monoxide (NO) to nitrogen dioxide (NO2) contained in the exhaust emission. The DOC 31 oxidizes CO to carbon dioxide (CO2) burns HC as an increase in the exhaust gas temperature. In the embodiment, the DOC 31 has a casing and the outer shape of the casing is a cylindrical shape. The center axis line of the DOC 31 is in a frontward-rearward direction of the vehicle, i.e., a longitudinal direction 39 of the lower frame 13. The exhaust emission from the exhaust pipe 38 flows on the front side of the DOC 31 in the longitudinal direction 39.

The SCR 32 reacts with a reducing agent in the exhaust to reduce nitrogen oxide (NOX), and then finally converts the exhaust to a gas mixture of nitrogen (N2) and water (H2O) and emits the same to the atmosphere. In the embodiment, the DRT 33 supplies urea water for reducing the NOX in the exhaust emission. When the DRT 33 ejects the urea water into the exhaust emission, hydrolysis occurs to generate ammonium (NH3), and then the NOX is reduced by the NH3. Note that both the structure of the SCR 32 and the structure of the DRT 33 are already known.

In the embodiment, the DRT 33 includes a cylindrical pipe 42 and a supply valve 43 connected to the cylindrical pipe 42, and guides the urea water from the urea water tank 50. The supply valve 43 is connected to the urea water tank 50 via a pipe 53 and ejects the urea water into the cylindrical pipe 42 at a predetermined pressure. The DRT 33 is disposed in series with the DOC 31. In other words, the center axis line of the DRT 33 is in agreement with the center axis line of the DOC 31. The DRT 33 is disposed on the front side of the DOC 31 in the longitudinal direction 39 and extends in the forward direction. The exhaust emission passing through the DOC 31 flows in the longitudinal direction 39 to flow into the cylindrical pipe 42 of the DRT 33, and then receives the supply of the urea water from the supply valve 43.

The SCR 32 has a casing and the outer shape thereof is formed into a cylindrical shape. The center axis line of the SCR 32 is parallel to the longitudinal direction 39 of the rough terrain crane 10. In the embodiment, the SCR 32 is disposed in parallel to the DOC 31, and a coupling pipe 44 is connected both of them, in which the coupling pipe is formed to be a substantial U shape. The exhaust emission passing through the DRT 33 enters the coupling pipe 44, and then makes a U-turn to enter the SCR 32 disposed downstream of the DRT 33. In the SCR 32, the exhaust emission is controlled to be discharged as N2 and H2O as described above.

[Urea Water Tank]

In general, the urea water tank 50 illustrated in FIG. 3 is made of a material such as resin or stainless steel having high corrosion resistance against the urea water and excellent weather resistance and impact resistance. There is no particular limitation on the shape of the urea water tank 50; however, in the embodiment, the tank is formed to have a substantially rectangular parallelepiped shape.

Figure 5:
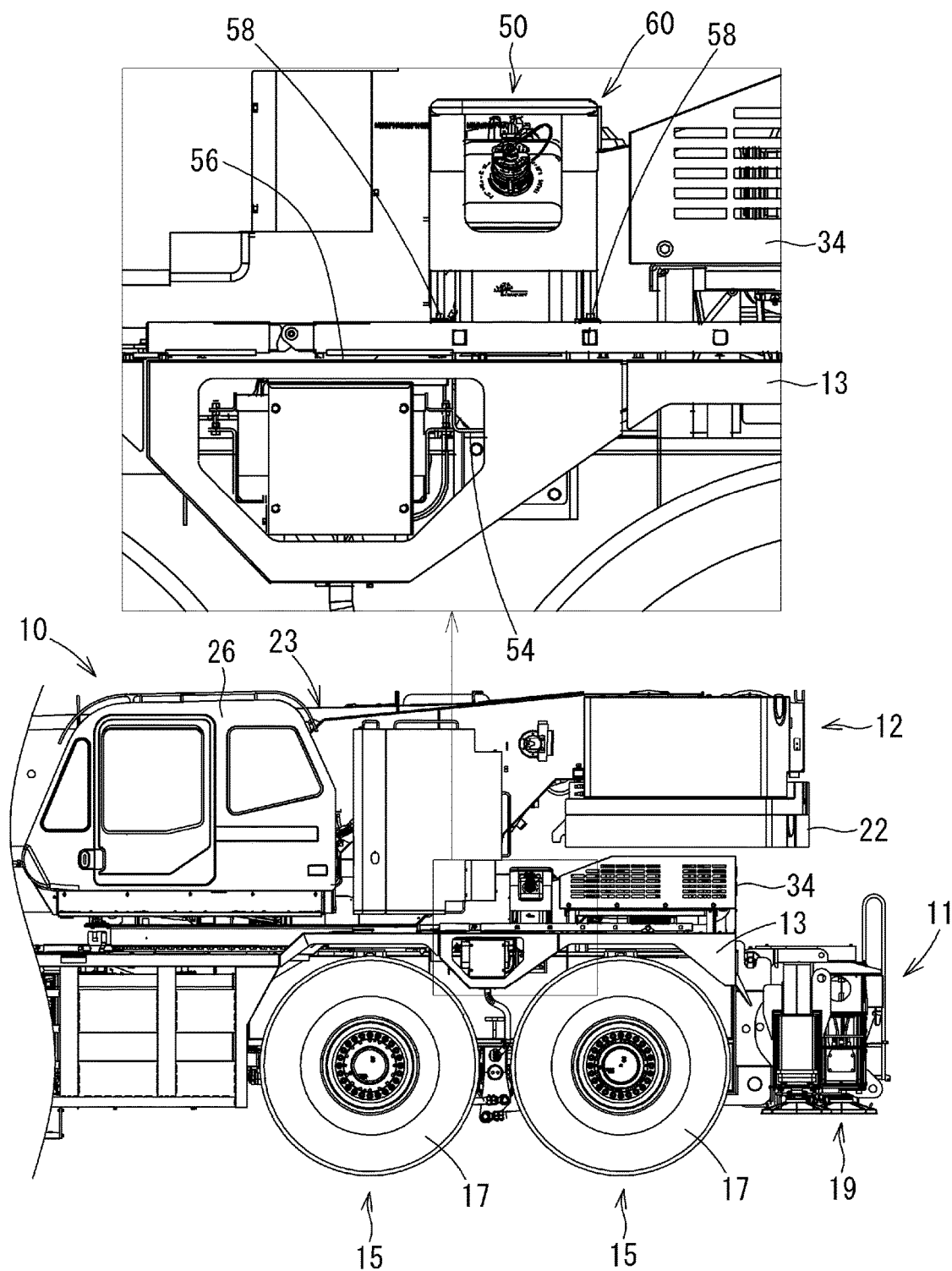
FIG. 5 is a side view of the rough terrain crane according to the embodiment and a view illustrating the periphery of a urea water tank.

FIG. 5 is a side view of the rough terrain crane 10 according to the embodiment and a view illustrating the periphery of the urea water tank 50. As illustrated in FIG. 5, the urea water tank 50 is disposed on the rear side from a front-side axle of the rear axle 15, and on the front side from the rear-side axle thereof. In addition, as illustrated in FIGS. 3 and 4, the urea water tank 50 is disposed on the front side of the DOC 31, the DRT 33, and the SCR 32. In addition, the urea water tank 50 is disposed in the vicinity of the left side of the diesel engine 20 when viewed from the rear side of the vehicle. In other words, the urea water tank 50 is disposed on a front side of the exhaust emission control device 30 in the vicinity of the engine 20.

As illustrated in FIG. 3, the urea water tank 50 is supported by a support base 54. The support base 54 is fixed to the lower frame 13. The support base 54 has a box shape of which the upper side is opened. The urea water tank 50 is supported on the support base 54 in a state in which a lower portion of the urea water tank 50 enters the inside of the support base 54. Note that a reinforcement frame 55 fixed to the lower frame 13 is disposed on the lower side of the support base 54. The support base 54 is supported by the reinforcement frame 55.

As illustrated in FIG. 5, the support base 54 is disposed below the top surface 56 of the lower carrier 11. In addition, an opening (not illustrated) is formed above the support base 54. The urea water tank 50 communicates with the opening and is disposed in a state of being dropping downward from the top surface 56. An upper portion of the urea water tank 50 overhangs and is exposed upward from the lower carrier 11 through the opening.

As illustrated in FIG. 5, the urea water tank 50 has a protective frame 60 that surrounds and protects the urea water tank 50. The protective frame 60 covers the urea water tank 50 from above. The protective frame 60 is fixed to the upper end portion 57 (refer to FIG. 3) of the support base 54 with a screw 58. The protective frame 60 is reinforced by an increase in thickness of frames constituting the frame or bending of the frames. In this manner, the protective frame 60 functions as a step on which an operator steps.

The protective frame 60 may include an insulation member that surrounds and protects the urea water tank 50. There is no particular limitation on types of insulation members, and a fibrous insulation member such as glass wool or a foam-type insulation member such as urethane foam may be used. The insulation member is bonded to the outside of the protective frame 60. Note that the insulation member may be bonded to the inside of the protective frame 60 or may be bonded to both of the outside and the inside of the protective frame 60. In addition, the insulation member may be bonded to the protective frame 60 by means of a method other than the bonding. For example, the protective frame 60 is configured to have a cavity, and thus the insulation member may be disposed in an internal space of the protective frame 60.

[Effects of Operation by Exhaust Emission Control Device]

In the rough terrain crane 10, since the exhaust emission control device 30 is mounted, it is possible to control the exhaust of the rough terrain crane 10, and thus it is possible to meet the strict exhaust gas regulations in recent years. The urea water tank 50 included in the exhaust emission control device 30 is disposed on the front side of the exhaust emission control device 30 as illustrated in FIG. 3. Hence, the piping from the urea water tank 50 to the SCR 32 via the DRT 33 is simplified without an increase in the entire length and the entire width of the lower carrier 11 and the upper working unit 12, and thus the urea water is efficiently supplied to the DRT 33. Moreover, since the urea water tank 50 is disposed at a position illustrated in FIG. 5, the urea water tank 50 is disposed at a position facing an outer side of a side of the vehicle body. Therefore, it is easy to perform injecting work of the urea water into the urea water tank 50. In addition, the urea water tank 50 is disposed in the vicinity of the left side of the diesel engine 20 when viewed from the rear side of the vehicle. Hence, the urea water tank 50 is likely to receive radiation heat from the diesel engine 20. Further, cooling water of the diesel engine 20 is supplied to the urea water tank 50 such that it is easy to arrange the piping for heating•maintaining temperature of the urea water tank 50. In addition, since the urea water tank 50 is disposed at the position described above, there is no limitation on the layout design of the urea water tank 50 even in a structure in which the outriggers 18 and 19 are freely attached and detached as in the rough terrain crane 10 according to the embodiment. As described above, the urea water tank 50 is laid out at the optimal position without a loss in the small-radius turning performance, the rough terrain traveling performance of the rough terrain crane 10, and the high visibility or a wide range of view in a crane operation.

In addition, as illustrated in FIG. 5, since the urea water tank 50 is exposed from the top surface 56 of the lower carrier 11 and thus it is easy to inject the urea water into the urea water tank 50. In addition, since the urea water tank 50 is dropped downward from the top surface 56 of the lower carrier 11, the urea water tank 50 is laid out in a more compact manner.

In addition, as illustrated in FIG. 5, since the protective frame 60 surrounds the urea water tank 50, the protective frame 60 protects the urea water tank 50, and the protective frame 60 functions as a step of an operator. In this manner, it is easy to remove a boom root fulcrum pin that connects the boom device 23 to the lower carrier 11. Moreover, the protective frame 60 functions as the step for the operator, and thereby it is possible to satisfy requests of the exhaust gas regulations.

In addition, in a case where the insulation member is bonded to the protective frame 60, it is possible to reduce an increase in the temperature of the urea water tank 50 when the environment temperature increases during the work or in a case where the radiation heat from the diesel engine 20 is high. In this manner, the urea water is prevented from being degraded.

Modification Example

In the embodiment described above, the urea water tank 50 is disposed at the position illustrated in FIG. 5; however, the position is not limited thereto. For example, as long as the piping of the pipe 53 is allowed to be somewhat complicated, the urea water tank 50 may be disposed on the right side of the diesel engine 20 from the rear direction of the vehicle. In addition, the urea water tank 50 may be disposed in a space between the front axle 14 and the rear axle 15. In short, as long as the urea water tank 50 is positioned at a position at which it is easy to perform the injection work of the urea water and it is easy to receive the impact of the radiation heat from the diesel engine 20, the urea water tank 50 may be disposed at any portion.

In the embodiment described above, the exhaust emission control device 30 is disposed at the position adjacent to the left side of the diesel engine 20 when viewed from the vehicle-rear direction as illustrated in FIG. 2; however, the position is not limited thereto. For example, the exhaust emission control device 30 may be disposed at a position adjacent to the right side of the diesel engine 20 when viewed from the vehicle-rear direction.

In the embodiment described above, the urea water tank 50 is disposed with an interval from the exhaust emission control device 30 as illustrated in FIG. 5; however, the urea water tank 50 may be disposed to be adjacent to the exhaust emission control device 30. Specifically, the urea water tank 50 may be disposed in the vicinity of the front side of the coupling pipe 44. The urea water tank 50 is disposed in the vicinity of the front side of the coupling pipe 44, and thereby it is advantageous in that the piping from the urea water tank 50 to the DRT 33 is much more simplified.

The invention claimed is:

1. A rough terrain crane comprising:
   a lower carrier having a front axle and a rear axle;

a boom device disposed above the lower carrier; and a single operating unit that performs driving and a boom operation via a hydraulic actuator, wherein the lower carrier includes a lower frame, an outrigger provided to be freely attached and detached to an end portion of the lower frame, and an engine that is disposed on an upper side of a rear end portion of the lower carrier, drives the axles, and supplies hydraulic pressure to the hydraulic actuator, the rough terrain crane further comprising:

a reducing agent tank in which a reducing agent is stored; and an exhaust emission control device that has a decompression reactor tube and a selective catalyst reduction disposed downstream of the decompression reactor tube, wherein the exhaust emission control device is mounted to be laterally adjacent to the engine, and wherein the reducing agent tank is disposed on a front side of the exhaust emission control device and at laterally adjacent to the engine, wherein the reducing agent tank has a protective frame that surrounds and protects the reducing agent tank, and wherein the protective frame is mounted adjacent to a connecting portion of the boom device and the lower carrier.

2. The rough terrain crane according to claim 1, wherein the reducing agent tank is disposed at a position adjacent to the exhaust emission control device.

3. The rough terrain crane according to claim 1, wherein the reducing agent tank is disposed in a state of being dropped downward from the top surface of the lower carrier and a part of the reducing agent tank is exposed through the top surface.

4. The rough terrain crane according to claim 1, wherein the protective frame has an insulation member that surrounds the reducing agent tank.

5. The rough terrain crane according to claim 2, wherein the reducing agent tank is disposed in a state of being dropped downward from the top surface of the lower carrier and a part of the reducing agent tank is exposed through the top surface.

6. The rough terrain crane according to claim 2, wherein the protective frame has an insulation member that surrounds the reducing agent tank.

7. The rough terrain crane according to claim 3, wherein the protective frame has an insulation member that surrounds the reducing agent tank.

\* \* \* \* \*

UNITED STATES PATENT AND TRADEMARK OFFICE
CERTIFICATE OF CORRECTION

PATENT NO. : 10,273,123 B2  
APPLICATION NO. : 15/537772  
DATED : April 30, 2019  
INVENTOR(S) : Kazuya Omori et al.

Page 1 of 1

It is certified that error appears in the above-identified patent and that said Letters Patent is hereby corrected as shown below:

On the Title Page

At item (71), Line 1, "Kawaga" should be -- Kagawa --.

At item (57), Line 1, "SCR-quipped" should be -- SCR-equipped --.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*